United States Patent Office 3,201,336
Patented Aug. 17, 1965

3,201,336
GRAFT POLYMERIZATION UTILIZING
IONIZING RADIATION
Michel Magat, Adolphe Chapiro, and Jeanne Sebban Danon, Paris, France, assignors to Centre National de la Recherche Scientifique Ministere de l'Education Nationale, Paris, France, a corporation
No Drawing. Filed July 19, 1957, Ser. No. 672,857
Claims priority, application France, July 27, 1956, 57,487
9 Claims. (Cl. 204—154)

This invention relates to new and useful improvements in graft polymerization utilizing ionizing radiation.

In our co-pending application, Serial No. 553,156, filed December 14, 1955, now Patent 3,115,418, a process is described for producing graft polymers using ionizing radiation. In accordance with this process, a polymer is subject to ionizing radiation in the presence of oxygen to thereby form "active centers," i.e., points of activation or reactivity at which the grafting will take place. The irradiated polymer is then contacted with a monomer polymerizable by free radicals so that a graft copolymer is produced having a trunk corresponding to the starting polymer which is radiated and branches corresponding to polymers of the monomer with which the contacting was effected.

The starting polymers which form the trunk portion of the graft polymer constitute any polymer capable of producing the so called active centers under the ionizing radiation. Suitable polymers include for example, polyethylene, polyvinyl chloride, polyamide, polyglycolterephthalate, polystryene, rubber, cellulose acetate, polymethylmethacrylate cellulose, and many others, as well as their copolymers and graft polymers.

The ionizing radiation has a wave length much shorter than that of ultraviolet light such as β-rays, γ-rays, neutrons, accelerated electrons and heavy particles, X-rays and the like. Sources for this radiation include atomic piles, electron or particle accelerators, radioactive isotopes and X-ray equipment.

The type of ionizing radiation and the total dose to be used depends upon several factors including the properties which the resulting graft polymer is intended to possess and whether or not for a given polymer mass the grafting is only desired as a surface treatment or is to be extended to a substantial depth into the mass.

The oxygen which should be present during the irradiation to form the active centers which do not quickly break down and retain their activity for the subsequent contacting with the monomer, may be present in the form of the ambient oxygen or oxygen dissolved or inherently occluded in the polymer. When the radiation is effected in the presence of the oxygen, the polymers will retain the active centers for a surprisingly long storage or shelf life and retain their capacity for grafting for periods well in excess of one month when stored at room temperature.

The monomers with which the irradiated polymers are contacted include any monomer which is capable of being polymerized by free radicals. The term "monomer" is used in its broadest sense and designates a starting polymerizable material and not necessarily a monomeric unit from a structural standpoint. Examples of suitable monomers include lower olefins, such as, ethylene and further polymerizable polyenes, such as polyolefins, vinyl compounds such as vinyl chloride and vinylcarbazole dienes, for example, of the type of butadiene, acrylic derivatives such as acrylonitrile, acrylamide, and many others. These monomers are well known and defined in the art by their characteristic of being polymerizable under the influence of initiators producing free radicals.

The graft polymers produced generally possess properties which are appreciably different from those of ordinary copolymers, having properties as for example, of both the homopolymers of which they are formed and thus represent a class of compounds having properties different from those usual to ordinary plastic materials.

One object of this invention is the production of graft copolymers having a polymer trunk with graft branches of at least two different polymers. This and still further objects will become apparent from the following description:

In accordance with the invention, it has been discovered that in the above mentioned process in which a polymer is subjected to ionizing radiation in the presence of oxygen to thereby form active centers and thereafter the irradiated polymer is contacted with a monomer polymerizable by free radicals to form the graft copolymer, the graft copolymer so formed may be recovered while still containing active centers and may be thereafter contacted with at least one different monomer polymerizable by free radicals to thereby form a graft copolymer having a trunk corresponding to the starting polymer and graft branches corresponding to polymers of the various monomers used for the contacting. After each contacting the copolymer with the additional graft branches corresponding to the polymer of the monomer of the last contacting may be recovered still containing active centers and again contacted with a further different monomer to graft on further different graft branches.

The invention offers the possibility of producing polymers with the most varied characteristics which may be regulated and controlled as desired by controlling the types and amounts of the various branch graft chains grafted on to the trunk.

The contacting of the polymer, which has been irradiated, with each monomer so as to leave further active centers for subsequent grafting by contacting with further monomers, may be effected in various different manners.

In accordance with one mode of operation, the contacting with each monomer up to the last contacting is only effected for a period of time insufficient to utilize all of the active centers for the grafting. Thus for example, if three different monomers are to be grafted on to the irradiated polymer, the contacting with the first monomer is interrupted before all the active centers are utilized for the grafting. Thereafter the graft copolymer formed is contacted with the second monomer and the contacting is interrupted while the graft copolymer still contains active centers. Thereafter the contacting with the third monomer is effected, and this contacting may be effected under conditions so that all of the remaining active centers are utilized for the graft polymerization if desired.

Periods of time during which the contacting may be effected without utilization of all the active centers of the initial polymer depends on the particular starting polymer material, the intensity of the radiation, the temperature of contacting and the polymerization activity of the particular monomer. These periods of time however may be very easily empirically determined.

It is also possible to effect the successive grafting while choosing monomers of different polymerization reactivity using for example, in successive order, monomers of increasing reactivity toward polymerization by the active centers. In this manner the first contacted monomer may only use up a portion of the active centers, the second contacted monomer a further portion and the third contacted monomer a still further portion, etc.

The successive grafting may also be controlled by controlling the temperature at which each contacting is effected and effecting each subsequent contacting at a higher temperature. Thus for example, the irradiated polymer may be contacted with the first monomer at a relatively low temperature as for example, at 20–50° C. thereafter the contacting with the second monomer may be effected at an intermediate temperature as for example, about 50–80° C. and then the contacting with the third polymer may be effected at a still higher temperature of as for example, 80–100° C.

Various combinations of these above described modes of operation may of course be used.

It is also possible in accordance with the invention to control the areas at which the various grafting is effected. If for example starting irradiated polymer is a crystalline material having amorphous areas and crystal domains, it is possible to selectively graft one of the monomers onto the amorphous areas by effecting the contacting with this monomer at a temperature below the melting point of the crystal domains. The monomer could only penetrate into the crystal domains with difficulty so the grafting will preferably be effected at the amorphous area. If it is desired subsequent to this, to graft onto the crystal domains, the grafting may be effected at a temperature at which the crystal domains are melted so that the monomer may penetrate easily into these areas. Generally, when operating at a temperature above the melting point of the crystal domains, the grafting will be effected homogenously over the whole area contacted by the monomer.

The properties of the graft copolymers formed depend not only upon the various different types of graft polymer branches and the absolute and relative amounts of these branches but also upon the order in which the grafting of the different branches was effected. Thus for example, if polymers $B_n$ and $C_n$ corresponding to monomers B and C are grafted onto the polymer $A_n$, graft copolymers having different properties will be formed depending on whether $A_n$ is contacted first with B or first with C.

In the case where the polymer $B_n$ is insoluble in the monomer C and the polymer $C_n$ is soluble in the monomer B and it is desired to graft on a greater portion of the polymer $C_n$, it is preferable to first contact $A_n$ with the monomer C and thereafter with the monomer B. If polymer $A_n$ is first contacted with the monomer B so that the polymer $B_n$ is grafted thereon and then the monomer C is contacted with graft copolymer formed a different final graft copolymer is obtained than in the case set forth above in which the reverse order of contacting was effected.

In all other respects the conditions for irradiation of the starting polymer, the form of the starting polymer and the manner and conditions under which the contacting with the monomer is effected may be identical to those described in co-pending application 553,156. The actual contacting of the monomer with the polymer is preferably effected in the absence of oxygen since oxygen is a polymerization inhibitor though the monomer may be selectively contacted with the oxygen while maintaining the polymer out of substantial contact with this oxygen in order to inhibit homopolymerization of the monomer which may simultaneously occur, as described in the co-pending application. The contacting of the irradiated polymer with the various monomers may for example be effected depending on the particular polymers and monomers used in the temperature range of about 40–180° C.

The starting irradiated polymer is preferably substantially solid as for example, in solid or highly viscous form and preferably in a form of a semi-finished or finished article. The monomer is preferably in a form of a liquid phase and may be present for example in a suitable solvent or diluent.

The following examples are given by way of illustration and not limitation.

*Example 1*

A polyethylene film of 0.05 mm. thickness was irradiated in the presence of air with γ-rays using a 20 curie radioactive cobalt 60 source of irradiation until the film was irradiated with a total quantity of 3.5 megaroentgen units as determined on by the radio chemical yield of iron sulfate $$G_{Fe^{+++}} = 15.5$$

A piece of this film weighing about 0.0045 gram was sealed under vacuum in a glass ampoule containing 10 cm.³ of methylmethacrylate. The sealed tube was heated to 46° C. for 142 hours. During this period the film fragment considerably increased in its size. After drying its weight amounted to 0.0765 gram. A piece of this film weighing 0.007 gram was cut off and sealed under vacuum in a glass ampoule containing 8 cc. of acrylonitrile and heated in 19 hours at 105° C. The final weight of the film after drying amounted to 0.0089 gram and the film consisted of a graft copolymer having a polyethylene trunk with graft branches of polymethylmethacrylate and polyacrylonitrile.

*Example 2*

A further piece of the irradiated polyethylene film of Example 1 was cut off. This piece weighed 0.0052 gram and was sealed under vacuum in a glass ampoule with 6 cc. of methylmethacrylate. The ampoule was heated to 80° C. for one hour. The film was then removed and dried and had a weight of 0.130 gram. The film was then sealed under vacuum with 10 cc. of acrylonitrile and heated to 135° for 3 hours. After removal and drying the film weighed 0.0273 gram. The film consisted of a graft copolymer having a polyethylene trunk and graft branches of polymethylmethacrylate and polyacrylonitrile.

*Example 3*

A piece of polypropylene film having a thickness of 0.35 mm. and a weight of 0.033 g. was subjected to gamma rays from a 20 curies cobalt-60 source to a total dose of 9.82 megaroentgens at a dose rate of 7.600 roentgens per hour. This irradiation was performed in the presence of air at atmospheric pressure. The irradiated polypropylene was then sealed under vacuum in a glass ampoule containing 3 cm.³ of methylmethacrylate. This ampoule was kept at room temperature for 5 hours. After this period it was noticed that the film had increased in size. The ampoule was opened, the film removed washed with acetone and dried. Its final weight was 0.054 g., it was much harder than the original polypropylene and it swelled in hot methylethylketone without however being dissolved. After being dried the weight of the film remained unchanged. This grafted film was then sealed under vacuum in an ampoule with 5 cc. of acrylonitrile and the ampoule was heated for 15 minutes at 135°. After this treatment the film had again increased in size. After drying its weight was 0.261 g. and it do not swell to any noticeable extent after three hours heating in methylethylketone.

From the same ampoule some polyacrylonitrile could be recovered; its weight was 0.07 g.

We claim:

1. In the process for producing graft polymers in which an organic polymer in the form of a crystalline material having crystal domains is subjected to high energy ionizing radiation in the presence of oxygen with an effective radiation dose to cause formation of active centers and thereafter the irradiated polymer is contacted with a first monomer polymerizable by free radicals, the improvement which comprises recovering the graft copolymer formed by said contacting still containing active centers, and thereafter, without further radiation treatment, contacting said graft copolymer with at least one different second monomer polymerizable by free radicals to thereby form a graft copolymer having a trunk corresponding to said polymer and graft branches corresponding to polymers of said first and second monomers, said contacting with one of said first and second monomers being effected at a temperature above the melting point of said crystal domains, and the contacting with the other of said first and second monomers being effected at a temperature below the melting point of said crystal domains.

2. Improvement according to claim 1 in which said subsequent contacting with said second monomer is effected at a higher temperature than said first contacting.

3. Improvement according to claim 1 in which said first contacting is effected at a temperature between about 20–50° C. and second contacting is effected at a temperature between about 50–80° C.

4. Improvement according to claim 3 in which the graft copolymer still containing active centers is recovered after said second contacting and contacted with at least one additional third different monomer polymerizable by free radicals at a temperature between about 80–100° C.

5. Improvement according to claim 1 in which the graft copolymer formed by the second contacting is recovered still containing active centers and contacted with at least one additional third different monomer polymerizable by free radicals.

6. Improvement according to claim 1 in which the first mentioned contacting is interrupted prior to complete utilization of said active centers for the graft polymerization of said first monomer.

7. Improvement according to claim 1 in which said polymer is polyethylene, one of said first and second monomers is methylmethacrylate and the other of said first and second monomers is acrylonitrile.

8. Improvement according to claim 1 in which said polymer is in substantially solid form and said first and second monomers in liquid phase.

9. Improvement according to claim 1 in which said polymer is polypropylene, one of said first and second monomers is methylmethacrylate and the other of said first and second monomers is acrylonitrile.

References Cited by the Examiner
UNITED STATES PATENTS

| | | | |
|---|---|---|---|
| 2,666,025 | 1/54 | Nozaki | 204—158 |
| 2,798,061 | 7/57 | Coover et al. | 260—882 |
| 2,849,419 | 8/58 | Hayes et al. | 260—884 |
| 2,863,812 | 12/58 | Graham | 204—158 |
| 2,897,127 | 7/59 | Miller | 284—154 |
| 2,907,675 | 10/59 | Gaylord | 204—154 |

OTHER REFERENCES

Wall: "Effects of Radiation on Dielectric Materials," ONR Symposium Report ACR-2, Dec. 15, 1954.

Brookhaven National Laboratory Report No. 367, pp. 27, 28, February 1956.

Brookhaven National Laboratory Report No. 375, pp. 26, April 1956.

"J. Polymer Science," vol. 19, No. 91, pp. 219–224, January 1956.

Bovey: "Effects of Ionizing Radiation of Natural and Synthetic High Polymers," pp. 1–8 (1958).

Brookhaven National Laboratory Report No. 414, pp. 1–14, October 1956.

MURRAY TILLMAN, *Primary Examiner.*

J. R. SPECK, JOSEPH REBOLD, JOHN H. MACK,
*Examiners.*